United States Patent
Bastiaansen et al.

(10) Patent No.: US 9,868,512 B2
(45) Date of Patent: Jan. 16, 2018

(54) AIRPLANE WING, AN AIRPLANE AND A FLAP SYSTEM

(71) Applicant: FOKKER AEROSTRUCTURES B.V., Papendrecht (NL)

(72) Inventors: Adrianus Marinus Franciscus Bastiaansen, Breda (NL); Michel Schoonhoven, Hardinxveld-giessendam (NL)

(73) Assignee: FOKKER AEROSTRUCTURES B.V., Papendrecht (NL)

( * ) Notice: Subject to any disclaimer, the term of this patent is extended or adjusted under 35 U.S.C. 154(b) by 0 days.

(21) Appl. No.: 14/440,272

(22) PCT Filed: Oct. 29, 2013

(86) PCT No.: PCT/NL2013/050767
§ 371 (c)(1),
(2) Date: May 1, 2015

(87) PCT Pub. No.: WO2014/073954
PCT Pub. Date: May 15, 2014

(65) Prior Publication Data
US 2015/0291275 A1 Oct. 15, 2015

(30) Foreign Application Priority Data

Nov. 6, 2012 (NL) ..................................... 2009762

(51) Int. Cl.
*B64C 9/38* (2006.01)
*B64C 9/16* (2006.01)
(Continued)

(52) U.S. Cl.
CPC .................. *B64C 9/38* (2013.01); *B64C 9/16* (2013.01); *B64C 9/18* (2013.01); *B64C 13/00* (2013.01); *Y02T 50/32* (2013.01)

(58) Field of Classification Search
CPC .............. B64C 9/16; B64C 9/38; B64C 13/00
(Continued)

(56) References Cited

U.S. PATENT DOCUMENTS 2,207,453 A 7/1940 Blume
2,276,688 A * 3/1942 Dewoitine .............. B64C 21/08
244/213

(Continued)

FOREIGN PATENT DOCUMENTS

GB 2 038 737 7/1980

OTHER PUBLICATIONS

International Search Report for PCT/NL2013/050767 dated Dec. 20, 2013.
Written Opinion for PCT/NL2013/050767 dated Dec. 20, 2013.

*Primary Examiner* — Brian M O'Hara
*Assistant Examiner* — Keith L Dixon
(74) *Attorney, Agent, or Firm* — Nixon Peabody LLP; Jeffrey L. Costellia (57) ABSTRACT

An airplane wing comprises a main wing and a flap system that has a flap at the trailing edge of the main wing. An elongate flap track member is connected to the main wing in such a manner that it can be moved substantially in its longitudinal direction and is guided by supporting bearing elements relative to the main wing between a forward retracted position and a rearward extended position. The flap is rotatably connected to the rear end of the flap track member in such a manner that it can rotate about a rotation axis that extends substantially parallel to the trailing edge of the main wing, so that the flap moves together with the flap track member when the flap track member is moved and so that the flap can be rotated about the rotation axis mechanically independently of the movement of the flap track member. The flap system comprises an actuator system having two actuators. The first actuator is connected to the main wing and has an engagement member that engages the flap or the flap track member for moving the flap together with the flap track member so that the flap track member is move able between its retracted position and its extended position. The second actuator is connected to the flap track (Continued)

member so that the second actuator moves together with the flap track member when the flap track member is moved by means of the first actuator. The second actuator has an engagement member that engages the flap for rotating the flap about the rotation axis.

15 Claims, 6 Drawing Sheets

(51) Int. Cl.
  *B64C 9/18* (2006.01)
  *B64C 13/00* (2006.01)
(58) Field of Classification Search
  USPC .......................................................... 244/215
  See application file for complete search history.

(56) References Cited

U.S. PATENT DOCUMENTS

| | | | | |
|---|---|---|---|---|
| 3,583,660 A * | 6/1971 | Hurkamp | ............... | B64C 9/146 244/207 |
| 3,853,289 A * | 12/1974 | Nevermann | ............. | B64C 9/16 244/215 |
| 3,977,630 A * | 8/1976 | Lewis | ...................... | B64C 9/20 244/216 |
| 3,985,319 A * | 10/1976 | Dean | ........................ | B64C 9/20 244/216 |
| 4,248,395 A * | 2/1981 | Cole | ......................... | B64C 9/04 244/216 |
| 4,471,928 A * | 9/1984 | Cole | ......................... | B64C 9/00 244/215 |
| 4,544,118 A * | 10/1985 | Robinson | .................. | B64C 9/06 244/215 |
| 5,538,202 A * | 7/1996 | Thornburg | ............. | B64C 13/36 244/215 |
| 6,138,956 A * | 10/2000 | Monner | ................... | B64C 3/48 244/215 |
| 6,598,834 B2 * | 7/2003 | Nettle | ...................... | B64C 3/48 244/212 |
| 7,766,282 B2 * | 8/2010 | Kordel | ..................... | B64C 9/02 244/201 |
| 8,567,727 B2 * | 10/2013 | Morris | ..................... | B64C 9/26 244/211 |

* cited by examiner

AIRPLANE WING, AN AIRPLANE AND A FLAP SYSTEM

FIELD OF THE INVENTION

The invention relates to an airplane wing, comprising:
a main wing having a trailing edge,
a flap system, the flap system comprising:
  a flap at the trailing edge of the main wing,
  supporting bearing elements being fixed to the main wing, in particular within the main wing, and
  an elongate flap track member being connected to the main wing in such a manner that it can be moved substantially in its longitudinal direction and is guided by the supporting bearing elements relative to the main wing between a forward retracted position and a rearward extended position, the flap track member having a front end and a rear end,
the flap being rotatably connected to the rear end of the flap track member in such a manner that it can rotate about a rotation axis that extends substantially parallel to the trailing edge of the main wing, so that the flap moves together with the flap track member when the flap track member is moved and so that the flap can be rotated about the rotation axis mechanically independently of the movement and position of the flap track member.

BACKGROUND OF THE INVENTION

U.S. Pat. No. 2,207,453 discloses an airplane wing having a main wing and two auxiliary wings. The rear auxiliary wing is rotatably connected to the front auxiliary wing about a first rotation axis that runs transversely to the direction of flight. The front auxiliary wing is rotatably connected to a rear end of a slidable rail about a second rotation axis. The slidable rail can be moved relative to the main wing in a slidable manner between a retracted position and an extended position. A selection mechanism of levers, rods, guide rails, pivotal connections and slidable connections is used to select different modes of operation of the auxiliary wings. In the retracted position of the slidable rail, the front auxiliary wing is in a fixed angular position, and the rear auxiliary wing can be rotated relative to the front auxiliary wing. Thus, the rear auxiliary wing can be used as aileron. When the slidable rail has been moved to its extended position, the front auxiliary wing may also be held in a fixed angular position, and the rear auxiliary wing may be rotated relative to the front auxiliary wing, or the front and rear auxiliary wings may be rotated together in order to control the rolling movement of the airplane. Furthermore, with the slidable rail in its extended position, it is possible for the front and rear auxiliary wings to be rotated in opposite directions. Thus, the front and rear auxiliary wings may be rotated about their rotation axes in a mutually dependent manner.

The second auxiliary wing at the rear of the first auxiliary wing, and the selection mechanism of levers, rods, guide rails, pivotal connections and slidable connections are complicated, generally unreliable and relatively heavy. In addition, the selection mechanism in its retracted position protrudes below the main wing, which causes increased drag and a higher risk of damage, for example by bird impacts.

OBJECT OF THE INVENTION

An object of the invention is to provide an improved airplane wing.

SUMMARY OF THE INVENTION

This object is achieved according to the invention in that the flap system further comprises an actuator system, the actuator system comprising:
  a first actuator being connected to the main wing and having an engagement member that engages the flap or the flap track member for moving the flap together with the flap track member so that the flap track member is moveable between its retracted position and its extended position, and
  a second actuator being connected to the flap track member so that the second actuator moves together with the flap track member when the flap track member is moved by means of the first actuator, the second actuator having an engagement member that engages the flap for rotating the flap about the rotation axis.

According to the invention, the flap can be extended rearward by operating the first actuator and the flap can be rotated upward or downward by operating the second actuator. A downwardly rotated position of the flap increases wing area and also the mean camber line of the airplane wing, thereby increasing the coefficient of lift. Thus, the airplane wing can be continuously adapted between at least a first configuration having a first coefficient of lift and a second configuration having a second coefficient of lift that is greater than the first coefficient of lift.

With the flap track member being guided by the supporting bearing elements relative to the main wing, the flap track member can be moved in a sliding or rolling manner. The elongate flap track member can be moved substantially in its longitudinal direction, i.e. along a longitudinal axis of the elongate flap track member. For extending and retracting the flap, the elongate flap track member can be moved in a reciprocating manner from its retracted position to its extended position and vice versa by means of the first actuator. The first actuator has a displaceable engagement member that engages the flap or the flap track member. The engagement member of the first actuator can be driven in a controlled manner. As the flap is connected to the rear end of the flap track member, the flap moves in unison with the flap track member when the latter moves between its retracted position and its extended position. In the retracted position of the elongate flap track member, the flap has a stowed position. When the elongate flap track member has been displaced to its extended position, the flap has a deployed position.

The flap can be rotated about the rotation axis independently of the guided movement of the flap track member, i.e. the orientation of the flap can be adjusted irrespective of the movement and position of the flap track member. Thus, it is possible to rotate the flap about the rotation axis in its stowed position and in its deployed position, and also in intermediate positions therebetween. The second actuator is carried by the flap track member, i.e. the second actuator moves in unison with the flap track member when the latter is moved from its retracted position to its extended position and vice versa. The second actuator has a displaceable engagement member that engages the flap so as to rotate the flap about the rotation axis. The engagement member of the second actuator can be driven in a controlled manner.

As the flap track member is movable relative to the main wing, the flap system can be designed to be received within the main wing in the retracted position of the flap track member. In the retracted position, the main wing and the flap together may form an aerodynamically smooth wing assembly (composed wing), wherein the flap has a trailing edge that is aligned with the trailing edge of the main wing, i.e. the trailing edge of the flap forms part of the trailing edge of the wing assembly. Thus, the wing assembly defines an improved streamlined aerodynamic outer surface than conventional flap systems. Preferably, the flap track member does not protrude below the main wing, i.e. the flap track member does not increase drag. It is noted that conventional flap systems used with modern airplanes include flap tracks that are fixed below the main wing. Although such flap tracks are covered by flap track fairings and the fairing drag can be decreased with sophisticated aerodynamic design, the fairing drag still remains substantial at high airspeeds during cruise. The flap system according to the invention can be designed so that there is no parasitic drag of the flap system in the retracted position of the flap track member and the stowed position of the flap. This also reduces the risk of damage by bird impacts. In addition, as the second actuator is carried by the extendable flap track member, the flap system according to the invention has a limited number of moving parts. This results in high reliability. Furthermore, the flap system according to the invention can be made relatively compact, so that it does not occupy much space in the main wing thus maintaining sufficient fuel storage capacity of the main wing.

In a preferred embodiment, the first actuator and the second actuator can be controlled independently from each other. For example, the flap system comprises a first control device that is configured to control the first actuator independently of the second actuator, and a second control device that is configured to control the second actuator independently of the first actuator. Of course, the first and second control device may be integrated into one control unit or control system. If the first actuator and the second actuator can be operated independently from each other—extension and rotation of the flap are controlled independently from each other—the flap has two degrees of freedom. As the extension of the flap is not mechanically coupled to its rotation, the flap can be adjusted to any desired position.

The first actuator can be designed in various ways. It is possible for the first actuator to be a linear actuator. The engagement member of the first linear actuator can be configured to be displaced along a substantially straight line, i.e. along the longitudinal axis of said engagement member. For example, the first linear actuator comprises a spindle actuator, such as an electromechanical spindle actuator. The spindle actuator may be provided with a threaded shaft and a drive nut member engaging the threaded shaft, wherein the drive nut member can be driven by an electric motor so as to move the threaded shaft along its longitudinal axis. A spindle actuator is very reliable for extending the flap.

In an embodiment, the flap track member is configured to follow a curved path when the flap track member is moved relative to the main wing between its retracted position and its extended position, wherein the first actuator is connected to the main wing so that its engagement member can tilt in a substantially vertical plane. Thus, the engagement member of the first actuator may be designed to be pivotable about a pivot axis that extends substantially parallel to the rotation axis of the flap. For example, the extendable flap track member has a curved shape, as seen in its longitudinal direction, and it is guided along a corresponding curved path. In this embodiment, when the flap track member is moved by the first actuator from its retracted position to its extended position, the flap, being connected to the rear end of the flap track member, is extended rearward and downward relative to the trailing edge of the main wing. The rotation of the flap can be superimposed additionally by operating the second actuator.

The second actuator can also be designed in various ways. For example, the second actuator is a linear actuator. The engagement member of the second linear actuator can be configured to be displaced along a substantially straight line, i.e. along the longitudinal axis of said engagement member. In a preferred embodiment, the second linear actuator comprises a hydraulic actuator, for example a double-acting hydraulic actuator. When controlling the rotation of the flap by means of the hydraulic actuator, the response time is relatively short, i.e. the flap can be subjected to rapid rotational adjustments.

In this case, it is possible that the hydraulic actuator comprises hydraulic connections for supplying and discharging hydraulic fluid, wherein flexible supply and discharge lines are connected to the hydraulic connections in such a manner that the flexible supply and discharge lines change shape when the flap track member is moved. The flexible supply and discharge lines may be received in a flexible travelling system, for example of a caterpillar type. Thus, the hydraulic actuator can be operated and controlled in a reliable manner while the hydraulic actuator is displaced together with the flap track member.

In a preferred embodiment, the engagement member of the second linear actuator comprises a drive shaft that can be moved along a substantially straight line relative to the flap track member, and also a linkage member that is pivotally connected to the drive shaft in such a manner that it can pivot about a first linkage member pivot axis that extends substantially parallel to the rotation axis of the flap, and wherein the linkage member is pivotally connected to the flap in such a manner that it can pivot about a second linkage member pivot axis that extends at a distance from and substantially parallel to the first linkage member pivot axis and the rotation axis of the flap so that the flap rotates about its rotation axis when the drive shaft of the second linear actuator is moved along a substantially straight line relative to the flap track member. In this case, the second linear actuator is pivotally connected to the flap by means of the linkage member. Thus, the displacement of the drive shaft along a straight line is converted into rotation of the flap. When the second linear actuator is a hydraulic actuator having a piston rod, said piston rod forms the drive shaft.

In order to guide the elongate flap track member in its longitudinal direction in a sliding or rolling manner relative to the main wing between its retracted position and its extended position, it is possible for the main wing to comprise a guide frame that is provided with the supporting bearing elements, which guide frame is configured to guide the elongate flap track member relative to the main wing between said positions. The guide frame is fixed to the wing structure and comprises the supporting bearing elements. Preferably, the flap track member comprises longitudinal grooves, for example on either side of the flap track member, wherein the supporting bearing elements are arranged within the longitudinal grooves for retaining the flap track member. For example, the supporting bearing elements may be formed by supporting guide rollers that support and guide the elongate flap track member. The supporting guide rollers minimize friction when the flap track member is moved relative to the guide frame.

In a preferred embodiment, the main wing comprises a front spar, a rear spar, and a plurality of wing ribs that are fixed between the front spar and the rear spar, and wherein the flap track member in its retracted position is received, at least partially, and optionally substantially entirely, inside the main wing between the front spar, the rear spar and two adjacent wing ribs. The front spar and the rear spar extend substantially parallel to each other in the spanwise direction of the main wing. The wing ribs extend substantially transversely with respect to the front spar and the rear spar. The front spar, the rear spar and the wing ribs are covered by a wing skin that is generally provided with stiffeners. Most modern airplanes have such a "wing box". The flap track member in its retracted position is received within the wing box of the main wing so that the flap track member does not project significantly below the main wing. In the retracted position of the flap track member, the main wing and the flap define an airfoil in cross-section and the flap track member does not protrude significantly from said airfoil shape. Thus, the flap track member does not cause parasitic drag and reduces the risk of damage, for example by bird collision.

In this embodiment, it is possible that the rear spar comprises a passage opening through which the flap track member travels when the flap track member is moved between its retracted position and its extended position, wherein the passage opening in the rear spar opens into a fluid-tight housing inside the main wing that is configured to receive the flap track member in its retracted position inside the main wing between the front spar, the rear spar and two adjacent wing ribs. The fluid-tight housing is sealed off from the interior of the main wing that can be used to store fuel. The flap track member and other components of the flap system that extend within the wing box are "canned" in the fluid-tight housing so that fuel stored inside the wing box cannot enter the fluid-tight housing that houses the flap system. Preferably, the fluid-tight housing closely surrounds the portion of the flap system that extends inside the wing box so that the fuel storage capacity of the main wing is reduced only to a minimal extent.

In a preferred embodiment, the main wing has a chord which is defined by a straight line between the leading edge and the trailing edge of the main wing, and wherein the second actuator is configured to rotate the flap about the rotation axis in an upward direction and in a downward direction relative to the chord of the main wing. Using the control device for the second actuator, the flap can be controlled to rotate about the rotation axis either in an upward direction or a downward direction with respect to the chord of the main wing, i.e. the flap can be selectively controlled in both directions. Thus, the flap can be used as aileron, i.e. the flap constitutes a "flaperon". For example, the deployment angle of the flap is at least 40 degrees downwards and at least 3 degrees upwards. As the rotation of the flap can be controlled independently from the extension of the flap track member, the flap can also be used as aileron when the flap track member is retracted and the flap has its stowed position. In this case, the flap can be used to fine-tune the airplane for minimum drag and/or minimum fuel consumption in cruise flight conditions.

The invention also relates to an airplane comprising an airplane wing as described herein.

In addition, the invention relates to a flap system for an airplane wing comprising a main wing, the flap system comprising:

a flap being configured to be arranged at a trailing edge of the main wing, supporting bearing elements being configured to be fixed to the main wing, and an elongate flap track member being configured to be connected to the main wing in such a manner that it can be moved substantially in its longitudinal direction and is guided by the supporting bearing elements relative to the main wing between a forward retracted position and a rearward extended position, the flap track member having a front end and a rear end, the flap being rotatably connected to the rear end of the flap track member in such a manner that it can rotate about a rotation axis that extends substantially parallel to the trailing edge of the main wing, so that the flap moves together with the flap track member when the flap track member is moved and so that the flap can be rotated about the rotation axis mechanically independently of the movement and position of the flap track member, wherein the flap system further comprises an actuator system, the actuator system comprising:

a first actuator being configured to be connected to the main wing and having an engagement member that engages the flap or the flap track member for moving the flap together with the flap track member so that the flap track member is moveable between its retracted position and its extended position, and a second actuator being connected to the flap track member so that the second actuator moves together with the flap track member when the flap track member is moved by means of the first actuator, the second actuator having an engagement member that engages the flap for rotating the flap about the rotation axis.

The flap system according to the invention can be provided with one or more of the features described herein.

The invention furthermore relates to a method for adjusting the position of a flap of an airplane wing as described herein, wherein the position of the flap is adjusted by operating the first actuator for moving the flap together with the flap track member, in particular for extending or retracting the flap, whereby the flap track member is moved partially or fully along a path between its retracted position and its extended position, and/or by operating the second actuator for rotating the flap about the rotation axis.

The invention will now be explained in more detail with reference to an exemplary embodiment shown in the figures.

DESCRIPTION OF EMBODIMENTS

Figure 1:
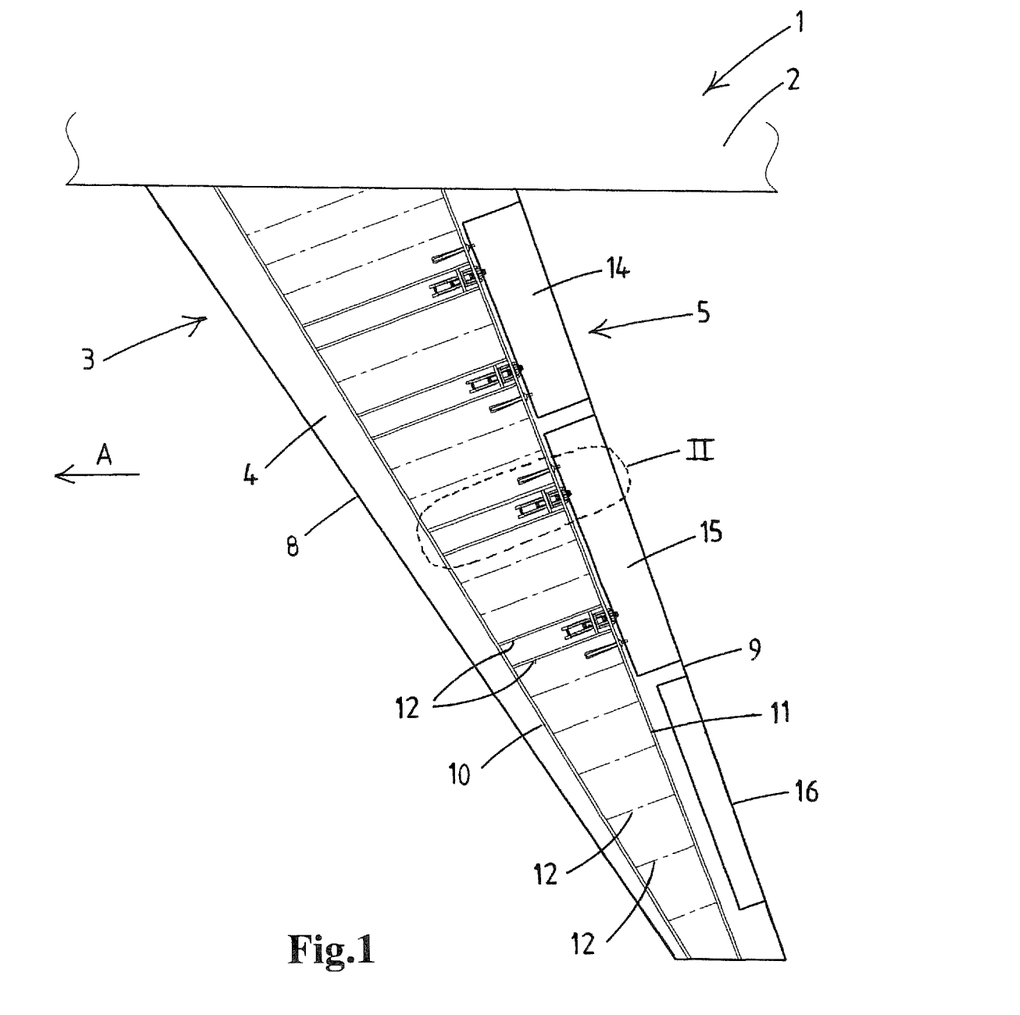
FIG. 1 is a schematic top view of the airplane wing according to the invention.

Referring now to the exemplary embodiment illustrated in the drawings, FIG. 1 shows a schematic representation of part of a conventional airplane 1 comprising a fuselage 2 and two airplane wings 3 (only one airplane wing is illustrated in FIG. 1). It should be understood that the airplane wings 3 are symmetrical about the fuselage 2. The flight direction of the airplane 1 and the airplane wing 3 is indicated by arrow A. Each airplane wing 3 includes a main wing 4 and a flap system 5. The flap system 5 is compatible with or adaptable to modern airplanes.

The main wing 4 includes a leading edge 8 and a trailing edge 9. The main wing 4 has an airfoil shape in cross-section. A chord is defined by a straight line between the leading edge 8 and the trailing edge 9. The structure of the main wing 4 comprises a front spar 10 and a rear spar 11 that run in the spanwise direction of the main wing 4. A plurality of wing ribs 12 are spaced relative to each other. Each wing rib 12 extends substantially transversely to the spanwise direction and is attached to the front spar 10 and to the rear spar 11 (the attachment of the wing ribs 12 to the front spar 10 is not shown in FIGS. 2, 4, 5a and 5b). A wing skin 17 surrounds the front spar 10, the rear spar 11 and the wing ribs 12 so as to form the airfoil shape (see FIG. 3—the upper wing skin has been omitted from FIGS. 1, 2, 4, 5a and 5b, so that the inner structural parts of the wing can be shown in these figures). Thus, a wing box structure is formed. The wing skin 17 may be provided with longitudinal stiffeners that run substantially in the spanwise direction (not shown).

In this exemplary embodiment, the flap system 5 comprises an inboard flap 14 at a first spanwise location and an outboard flap 15 at a second spanwise location of the main wing 4. The main wing 4 comprises an aileron 16 that is located at a third spanwise location outboard with respect to the outboard flap 15. The flaps 14, 15 and the aileron 16 are arranged at the trailing edge 9 of the main wing 4. Each flap 14, 15 can be displaced between a stowed position shown in FIGS. 1, 2, 3 and 5a and a deployed position shown in FIG. 5b. In the deployed position, the flap 14, 15 has been displaced to a rearward position relative to the stowed position, and can be rotated, for example, to a downward position (see FIG. 5b), thereby increasing the coefficient of lift.

Figure 2:
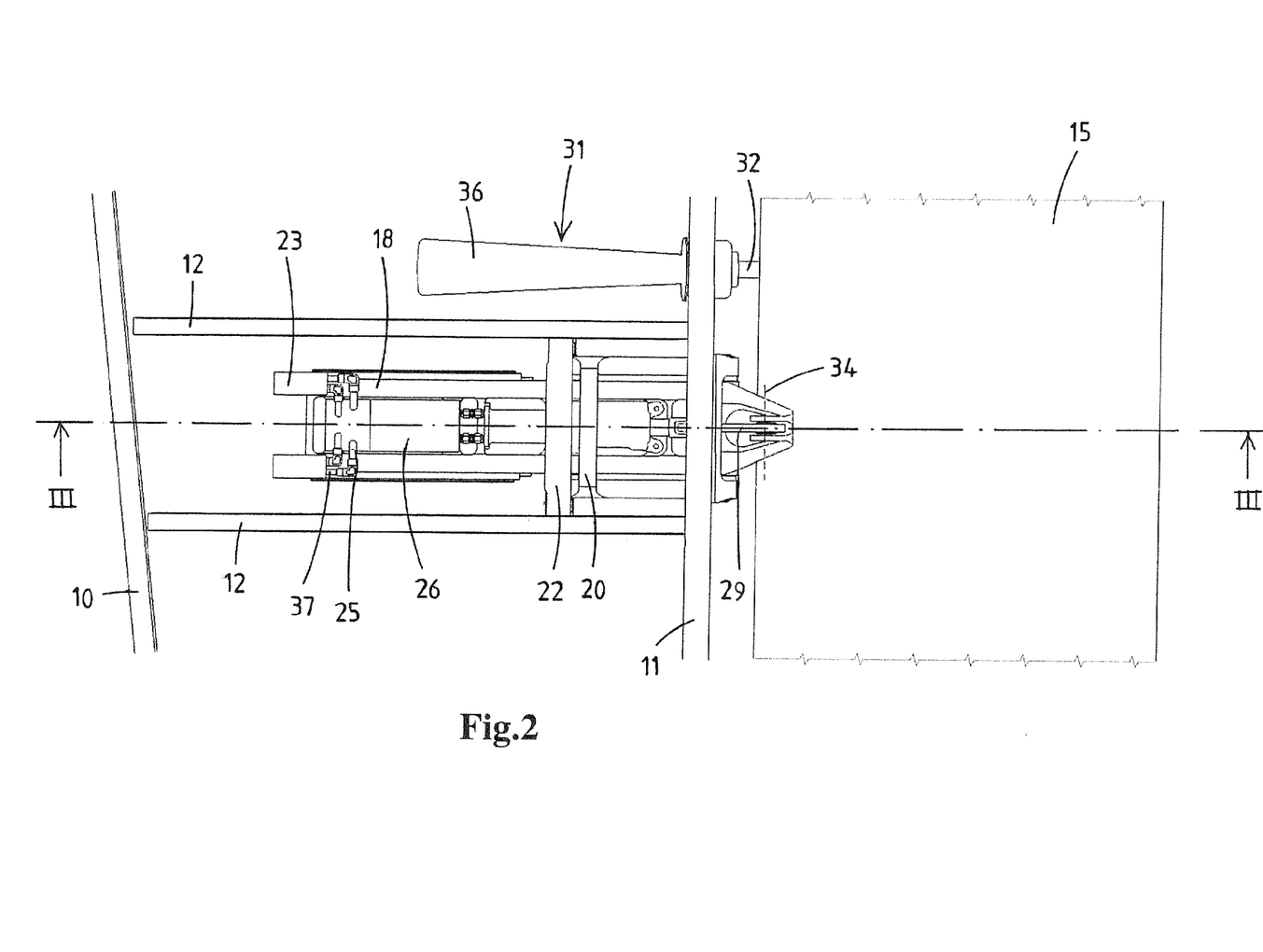
FIG. 2 is an enlarged top view of detail II in FIG. 1.
Figure 3:
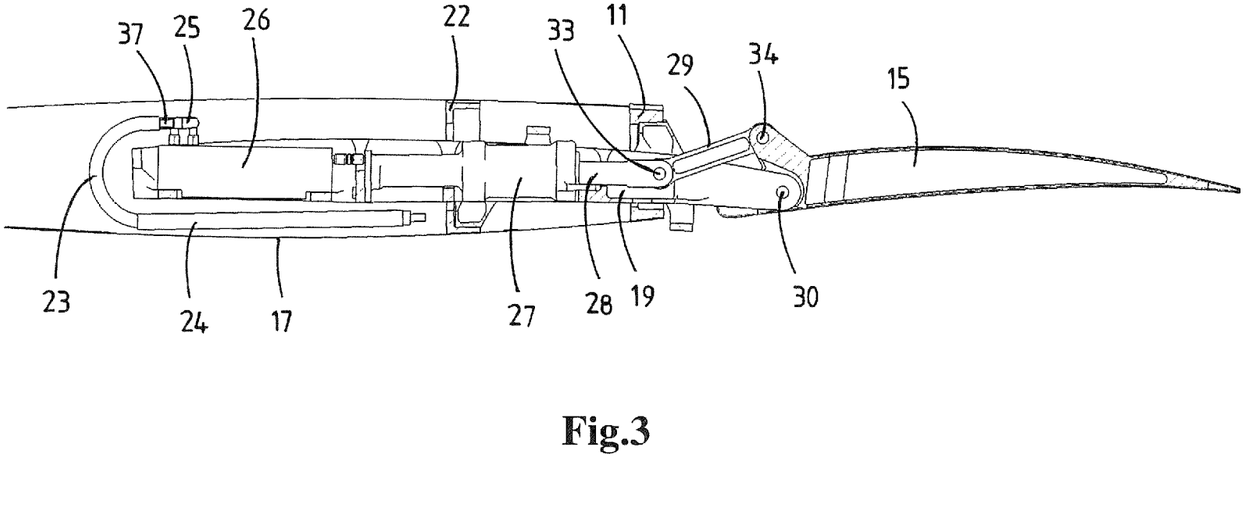
FIG. 3 is a cross-sectional view according to in FIG. 2.

The configuration and operation of the inboard flap 14 and the outboard flap 15 are substantially identical, and therefore only a detailed description of the outboard flap 15 is presented. As shown in FIGS. 2 and 3, the flap 15 is pivotally connected to the rear end of an elongate flap track member 18 so that it can rotate about a rotation axis 30 that extends substantially parallel to the trailing edge 9 of the main wing 4. The flap track member 18 has a front end and a rear end in the flight direction A of the airplane wing 3, and the flap track member 18 comprises longitudinal grooves 19 on either side. The longitudinal grooves 19 are retained by supporting guide rollers 21 of a guide frame 20 that is arranged to the structure of the main wing 4. In this exemplary embodiment, the guide frame 20 is connected and fixed to the rear spar 11. The rear spar 11 comprises a passage opening through which the flap track member 18 may protrude. The supporting guide rollers 21 are placed within the longitudinal grooves 19 for retaining the flap track member 18. Thus, the flap track member 18 is connected to the main wing 4 in such a manner that it is guided in a sliding or rolling manner relative to the main wing 4. The longitudinal side grooves 19 can be displaced in a sliding or rolling manner along the supporting guide rollers 21 of the guide frame 20, so that the flap track member 18 can be moved between a retracted position shown in FIGS. 1, 2, 3 and 5a and an extended position shown in FIG. 5b.

The flap track member 18 in its retracted position is received inside the wing box structure of the main wing 4 between the front spar 10, the rear spar 11 and two adjacent wing ribs 12 so that the flap track member 18 hardly projects, if at all, below the main wing 4. An auxiliary beam 22 is fixed substantially transversely between the two adjacent ribs 12 so as to strengthen the structure. The guide frame 20 may also be connected and fixed to the auxiliary beam 22. In the retracted position, the rear end of the flap track member 18 is located close to the rear spar 11 and the front end of the flap track member 18 is situated remote from the rear spar 11. The flap track member 18 may be canned in a fluid-tight housing (not shown) inside the wing box structure of the main wing 4 so that fuel that may be stored inside the main wing 4 cannot enter the fluid-tight housing. In the extended position of the flap track member 18, the rear end of the flap track member 18 protrudes over a distance beyond the rear spar 11, while the front end of the flap track member 18 is situated close to the rear spar 11.

As the flap 15 is rotatably connected to the rear end of the flap track member 18, the flap 15 and the flap track member 18 move in unison with each other when the flap track member 18 is displaced between its retracted position and its extended position. For the extension of the flap track member 18 together with the flap 15, the flap system 5 comprises a first actuator 31. In this exemplary embodiment, the first actuator 31 is an electromechanical linear spindle actuator that comprises a threaded shaft 32 that runs through an actuator housing 35 that is fixed to the rear spar 11.

Inside the wing box structure of the main wing 4, the threaded shaft 32 is canned in a fluid-tight cover 36, so that fuel stored inside the main wing 4 cannot enter the fluid-tight cover 36. The threaded shaft 32 is engaged by a drive nut member (not shown) that is housed within the housing 35 (see FIG. 4). By rotating the drive nut member, the threaded shaft 32 can be moved along its longitudinal axis relative to the drive nut member and relative to the housing 35 (since the drive nut member is confined within the housing 35). Depending on the direction of rotation of the drive nut member, the threaded shaft 32 is extended or retracted. The drive nut member may be driven conventionally, by way of a drive shaft running alongside and parallel to the rear spar 11, or may be driven by an electric motor or a hydraulic motor or in any other way.

Figure 4:
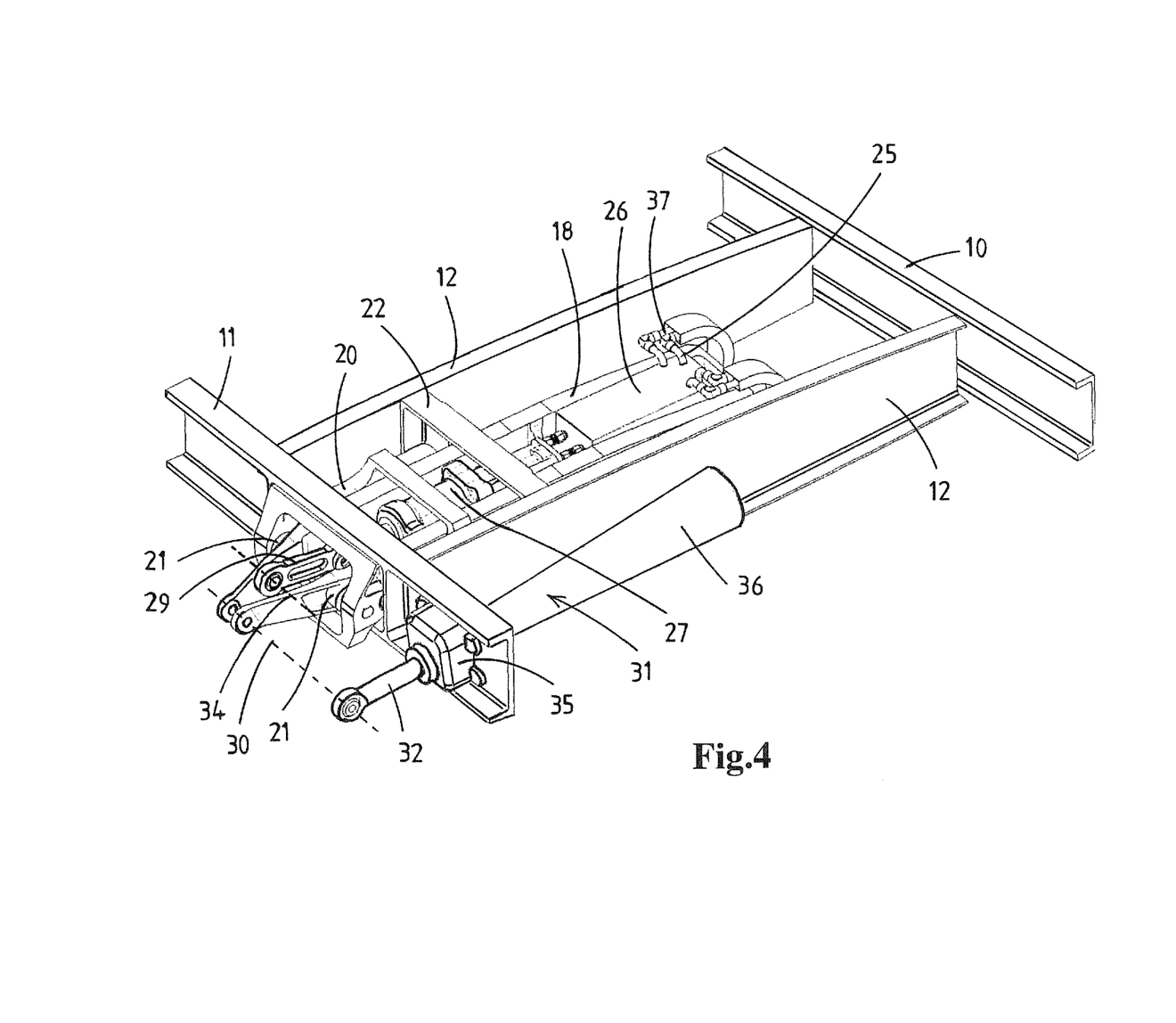
FIG. 4 is a perspective view of the flap system shown in FIG. 2.
Figure 5A:
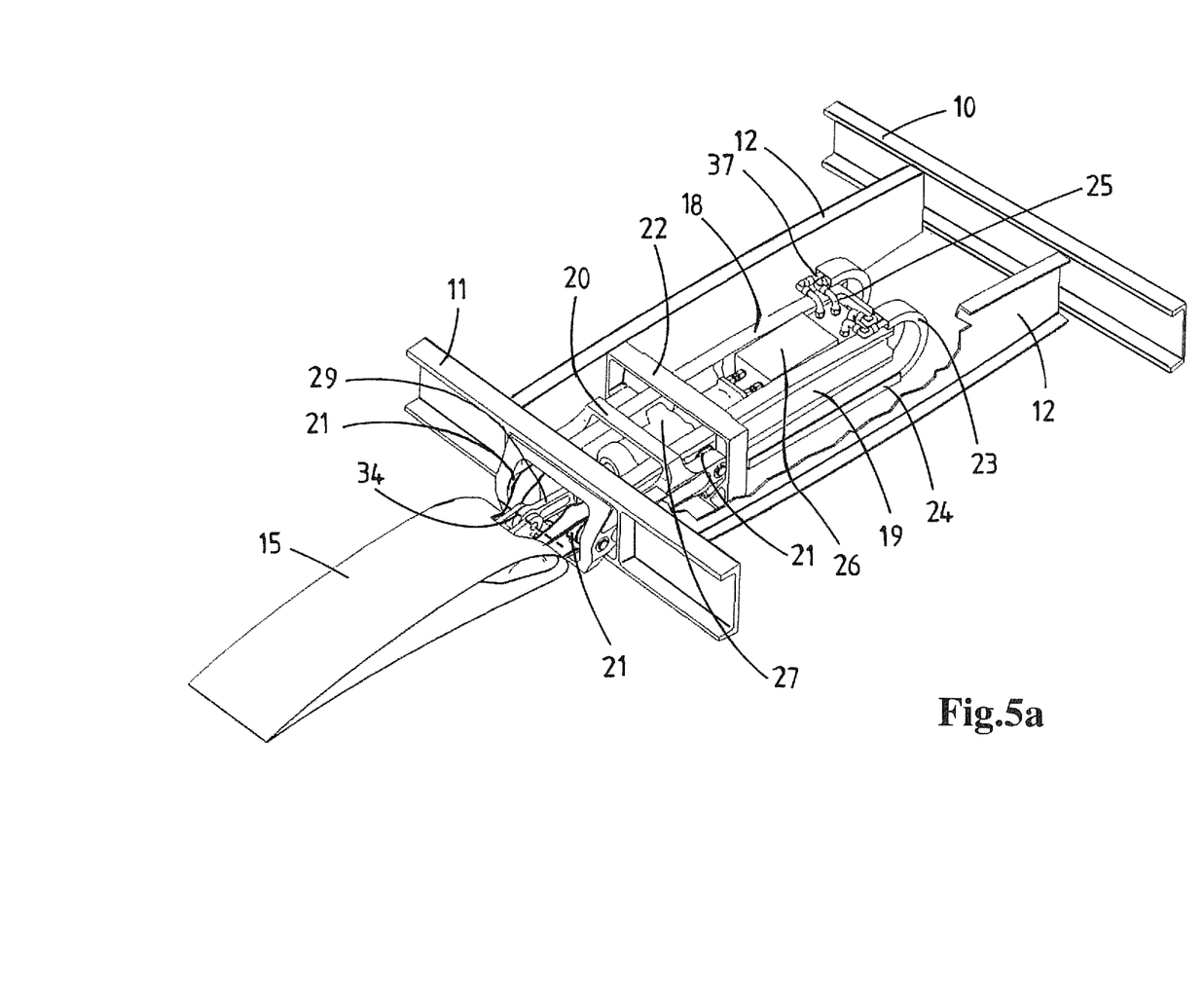
FIGS. 5a, 5b are perspective views of the flap system shown in FIG. 2, partly broken away, with the flap in its retracted position (FIG. 5a) and its extended position (FIG. 5b).
Figure 5B:
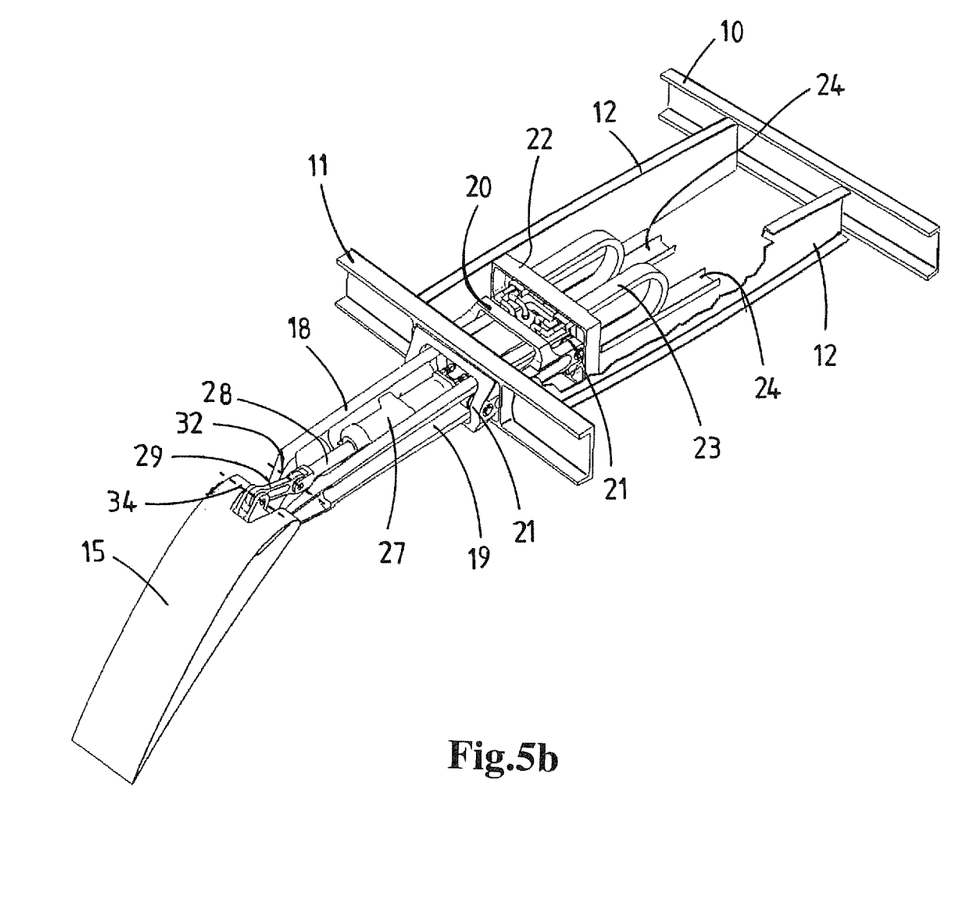

The threaded shaft 32 is pivotally connected to the flap 15 about the rotation axis 30, i.e. the pivotal connection between the threaded shaft 32 and the flap 15 and the pivotal connection between the flap track member 18 and the flap 15 define a common rotation axis 30 (see FIG. 4). By controlling the first actuator 31, it can exert a force onto the flap 15 so as to move the flap 15 and the flap track member 18 from the retracted position to the extended position and vice versa. The flap track member 18 may have a slightly downwardly curved shape, so that the flap moves rearward and downward when extending the flap track member 18. For that case and for the prevention of bend-loading the first actuator 31, or the threaded shaft 32, in a vertical plane, the threaded shaft 32 is tiltable suspended in the housing 35. Thus, the tiltable threaded shaft 32 is pivotally connected to the main wing 4 and has some freedom to tilt in a vertical plane within the housing 35. The cover 36 has a conical shape in order to provide space for the tilting movement of the threaded shaft 32 within the cover 36.

Irrespective of the extension position of the flap track member 18, the flap 15 can be rotated about the rotation axis 30. The rotation of the flap 15 about the rotation axis 30 is mechanically independent of the extension of the flap track member 18, i.e. the flap 15 has two degrees of freedom. For the rotation of the flap 15, the flap system 5 comprises a second actuator 27 that can be controlled independently from the first actuator 31. In this exemplary embodiment, the second actuator 27 comprises a double-acting hydraulic actuator 27 that is carried by the flap track member 18, i.e. the hydraulic actuator moves together with the flap track member 18 when the flap track member 18 is moved by means of the first actuator 31. The hydraulic actuator includes a piston rod 28 forming a drive shaft that can be reciprocated relative to the flap track member 18 along a substantially straight line.

The piston rod 28 is connected to the flap 15 by means of a linkage member 29 so as to rotate the flap 15 about the rotation axis 30. The linkage member 29 is an intermediate lever that serves as a connection element and is pivotally connected at one end to the piston rod about a first linkage member pivot axis 33 that extends substantially parallel to the rotation axis 30 of the flap 15. At the opposite end, the linkage member 29 is pivotally connected to the flap 15 about a second linkage member pivot axis 34 that extends at a distance from and substantially parallel to the rotation axis 30 of the flap 15. As a result, the flap 15 may be rotated about its rotation axis 30 when the piston rod 28 of the hydraulic actuator 27 is driven relative to the flap track member 18 along a substantially straight line.

The hydraulic actuator is controlled by means of a hydraulic control device 26. The control device 26 of the hydraulic actuator is provided with hydraulic connections 25 for supplying and for discharging hydraulic fluid. Flexible hydraulic lines 37 are connected to the hydraulic connections 25. The flexible lines 37 are retained in a travelling system. In this exemplary embodiment, the travelling system comprises flexible caterpillar elements 23 that are partially received within guide rails 24. The flexible lines 37 and the flexible caterpillar elements 23 transform when the flap track member 18 is extended or retracted. Using the control device 26 for controlling the hydraulic actuator, the flap 15 can be rotated about the rotation axis 30.

In this exemplary embodiment, the flaps 14, 15 can be controlled to rotate about the rotation axis 30 either in an upward direction or in a downward direction with respect to the chord of the main wing 4. Thus, the flaps 14, 15 can be used as aileron, i.e. the flaps 14, 15 each constitute a "flaperon". For example, the deployment angle of each flap 14, 15 is at least 40 degrees downwards and at least 3 degrees upwards. As the rotation of each flap 14, 15 can be controlled by means of the second actuator 27 independently from the extension of the flap track member 18 together with said flap 14, 15 by means of the first actuator 31, said flap 14, 15 can also be used as aileron when the flap track member 18 is retracted and said flap 14, 15 has its stowed position. Thus, in the stowed position, the flaps 14, 15 can also be used to fine-tune the airplane for minimum drag and/or minimum fuel consumption in any cruise flight condition.

The invention is not limited to the exemplary embodiment described above. The skilled person may make various modifications and variations without departing from the scope of the invention as defined by the claims. For example, the first actuator 31 may be provided between the front spar 10 and the front end of the flap track member 18 so as to move the flap track member 18 between its retracted position and its extended position. In this case, the first actuator 31 exerts an actuation force directly onto the flap track member 18. Furthermore, it should be understood that the first actuator as well as the second actuator may be actuators of any type, for example hydraulic actuators, electrical actuators having a spindle or a rack and pinion, or mechanical actuators, for example driven by a drive shaft.

The invention claimed is:

1. An airplane wing, comprising:
a main wing having a trailing edge,
a flap system, the flap system comprising:
a flap at the trailing edge of the main wing,
supporting bearing elements being fixed to the main wing, and
an elongate flap track member being connected to the main wing in such a manner that the flap track member is movable substantially in its longitudinal direction and is guided by the supporting bearing elements relative to the main wing between a forward retracted position and a rearward extended position, the flap track member having a front end and a rear end,
the flap being rotatably connected to the rear end of the flap track member in such a manner that the flap is rotatable about a rotation axis that extends substantially parallel to the trailing edge of the main wing, so that the flap moves together with the flap track member when the flap track member is moved and so that the flap is rotatable about the rotation axis mechanically independently of the movement and position of the flap track member,
wherein the flap system further comprises an actuator system, the actuator system comprising:
a first actuator being connected to the main wing and having an engagement member that engages the flap or the flap track member, wherein the first actuator is configured to move the flap together with the flap track member in said longitudinal direction so that the flap track member is moveable between its retracted position and its extended position, and
a second actuator being connected to the flap track member so that the second actuator moves together with the flap track member when the flap track member is moved in said longitudinal direction by means of the first actuator, the second actuator having an engagement member that engages the flap, and wherein the second actuator is configured to rotate the flap about the rotation axis,
wherein the first actuator and the second actuator are adapted to be controlled independently from each other.

2. An airplane wing as claimed in claim 1, wherein the first actuator is a linear actuator.

3. An airplane wing as claimed in claim 2, wherein the flap track member is configured to follow a curved path when the flap track member is moved relative to the main wing between its retracted position and its extended position, and wherein the first actuator is connected to the main wing so that its engagement member is tiltable in a substantially vertical plane.

4. An airplane wing as claimed in claim 1, wherein the second actuator is a linear actuator.

5. An airplane wing as claimed in claim 4, wherein the second linear actuator comprises a hydraulic actuator which comprises hydraulic connections for supplying and discharging hydraulic fluid, and wherein flexible supply and discharge lines are connected to the hydraulic connections in such a manner that the flexible supply and discharge lines change shape when the flap track member is moved.

6. An airplane wing as claimed in claim 4, and wherein the engagement member of the second linear actuator comprises a drive shaft that is movable along a substantially straight line relative to the flap track member, and also a linkage member that is pivotally connected to the drive shaft in such a manner that the linkage member is pivotal about a first linkage member pivot axis that extends substantially parallel to the rotation axis of the flap, and wherein the linkage member is pivotally connected to the flap in such a manner that the linkage member is pivotal about a second linkage member pivot axis that extends at a distance from and substantially parallel to the first linkage member pivot axis and the rotation axis of the flap so that the flap rotates about its rotation axis when the drive shaft of the second linear actuator is moved along a substantially straight line relative to the flap track member.

7. An airplane wing as claimed in claim 1, wherein the main wing comprises a guide frame that is provided with the supporting bearing elements, for guiding the elongate flap track member relative to the main wing between its retracted position and its extended position.

8. An airplane wing as claimed in claim 1, wherein the flap track member comprises longitudinal grooves, and wherein the supporting bearing elements are arranged within the longitudinal grooves for retaining the flap track member.

9. An airplane wing as claimed in claim 1, wherein the supporting bearing elements are formed by supporting guide rollers that support and guide the elongate flap track member.

10. An airplane wing as claimed in claim 1, wherein the main wing comprises a front spar, a rear spar, and a plurality of wing ribs that are fixed between the front spar and the rear spar, and wherein the flap track member in its retracted position is substantially received inside the main wing between the front spar, the rear spar and two adjacent wing ribs.

11. An airplane wing as claimed in claim 10, wherein the rear spar comprises a passage opening through which the flap track member travels when the flap track member is moved between its retracted position and its extended position, and wherein the passage opening in the rear spar opens into a fluid-tight housing inside the main wing that is configured to receive the flap track member in its retracted position inside the main wing between the front spar, the rear spar and two adjacent wing ribs.

12. An airplane wing as claimed in claim 1, wherein the main wing has a chord which is defined by a straight line between the leading edge and the trailing edge of the main wing, and wherein the second actuator is configured to rotate the flap about the rotation axis in an upward direction and in a downward direction relative to the chord of the main wing.

13. An airplane comprising an airplane wing as claimed in claim 1.

14. A flap system for an airplane wing comprising a main wing, the flap system comprising:
  a flap being configured to be arranged at a trailing edge of the main wing,
  supporting bearing elements being configured to be fixed to the main wing, and
  an elongate flap track member being configured to be connected to the main wing in such a manner that it can be moved substantially in its longitudinal direction and is guided by the supporting bearing elements relative to the main wing between a forward retracted position and a rearward extended position, the flap track member having a front end and a rear end,
  the flap being rotatably connected to the rear end of the flap track member in such a manner that the flap is rotatable about a rotation axis that extends substantially parallel to the trailing edge of the main wing, so that the flap moves together with the flap track member when the flap track member is moved and so that the flap is rotatable about the rotation axis mechanically independently of the movement and position of the flap track member,
  wherein the flap system further comprises an actuator system, the actuator system comprising:
  a first actuator being configured to be connected to the main wing and having an engagement member that engages the flap or the flap track member, wherein the first actuator is configured to move the flap together with the flap track member in said longitudinal direction so that the flap track member is moveable between its retracted position and its extended position, and
  a second actuator being connected to the flap track member so that the second actuator moves together with the flap track member when the flap track member is moved in said longitudinal direction by means of the first actuator, the second actuator having an engagement member that engages the flap, and wherein the second actuator is configured to rotate the flap about the rotation axis,
  wherein the first actuator and the second actuator are adapted to be controlled independently from each other.

15. An airplane wing, comprising:
a main wing having a trailing edge,
a flap system, the flap system comprising:
  a flap at the trailing edge of the main wing,
  supporting bearing elements being fixed to the main wing, and
  an elongate flap track member being connected to the main wing in such a manner that the flap track member is movable substantially in its longitudinal direction and is guided by the supporting bearing elements relative to the main wing between a forward retracted position and a rearward extended position, the flap track member having a front end and a rear end,
the flap being rotatably connected to the rear end of the flap track member in such a manner that the flap is rotatable about a rotation axis that extends substantially parallel to the trailing edge of the main wing, so that the flap moves together with the flap track member when the flap track member is moved and so that the flap is rotatable about the rotation axis mechanically independently of the movement and position of the flap track member,
wherein the flap system further comprises an actuator system, the actuator system comprising:
a first actuator being connected to the main wing and having an engagement member that engages the flap or the flap track member, wherein the first actuator is configured to move the flap together with the flap track member in said longitudinal direction so that the flap track member is moveable between its retracted position and its extended position, and
a second actuator being connected to the flap track member so that the second actuator moves together with the flap track member when the flap track member is moved in said longitudinal direction by means of the first actuator, the second actuator having an engagement member that engages the flap, and wherein the second actuator is configured to rotate the flap about the rotation axis,
wherein the rear spar comprises a passage opening through which the flap track member travels when the flap track member is moved between its retracted position and its extended position, and wherein the passage opening in the rear spar opens into a fluid-tight housing inside the main wing that is configured to receive the flap track member in its retracted position inside the main wing between the front spar, the rear spar and two adjacent wing ribs.

* * * * *